United States Patent
Yen et al.

(10) Patent No.: US 12,403,723 B2
(45) Date of Patent: Sep. 2, 2025

(54) DRIVING ASSEMBLY AND TRANSFER DEVICE

(71) Applicants: Futaijing Precision Electronics (Yantai) Co., Ltd., Yantai (CN); HON HAI PRECISION INDUSTRY CO., LTD., New Taipei (TW)

(72) Inventors: Sheng-Li Yen, New Taipei (TW); Yu-Sheng Chang, New Taipei (TW); Chi-Cheng Wen, New Taipei (TW); Chiung-Hsiang Wu, New Taipei (TW); Chih-Cheng Lee, New Taipei (TW); Yu-Cheng Zhang, New Taipei (TW); Chen-Ting Kao, New Taipei (TW); Chang-Ju Hsieh, New Taipei (TW); Chen Chao, New Taipei (TW)

(73) Assignees: Futaijing Precision Electronics (Yantai) Co., Ltd., Yantai (CN); HON HAI PRECISION INDUSTRY CO., LTD., New Taipei (TW)

(*) Notice: Subject to any disclaimer, the term of this patent is extended or adjusted under 35 U.S.C. 154(b) by 570 days.

(21) Appl. No.: 17/885,151

(22) Filed: Aug. 10, 2022

(65) Prior Publication Data
US 2023/0373243 A1    Nov. 23, 2023

(30) Foreign Application Priority Data
May 20, 2022    (CN) ......................... 202210557028.X (51) Int. Cl.
    *B60B 33/00*      (2006.01)
    *B60B 19/00*      (2006.01)
    *B60B 19/12*      (2006.01)
(52) U.S. Cl.
    CPC ........ *B60B 33/0028* (2013.01); *B60B 19/003* (2013.01); *B60B 19/12* (2013.01)

(58) Field of Classification Search
CPC ........ B62D 61/10; B62D 63/02; B62D 63/04; B60B 33/0028; B60B 19/003; B60B 19/12
See application file for complete search history.

(56) References Cited

U.S. PATENT DOCUMENTS

| | | | |
|---|---|---|---|
| 11,865,890 B2 * | 1/2024 | Yen ..................... | B66F 9/07586 |
| 2023/0191863 A1 * | 6/2023 | Kao ..................... | B60G 9/003 180/16 |
| 2023/0202565 A1 * | 6/2023 | Kao ..................... | B62D 11/04 180/6.5 |

FOREIGN PATENT DOCUMENTS

| | | | | |
|---|---|---|---|---|
| CN | 105730553 A | | 7/2016 | |
| CN | 208774905 U | * | 4/2019 | ............. B62D 63/02 |

(Continued)

OTHER PUBLICATIONS

Computer generated English translation of CN 213705560 (Year: 2025).*

(Continued)

*Primary Examiner* — Paul N Dickson
*Assistant Examiner* — Tiffany L Webb
(74) *Attorney, Agent, or Firm* — ScienBiziP, P.C.

(57) ABSTRACT

A driving assembly and a transfer device to allow an adjustable length of wheelbase for varying sizes of loads comprises a driving device, a driving wheel connected to the driving device rotatable by the driving device, a cantilever assembly comprising a cantilever configured for mounting to the bearing platform, and a driven wheel rotatably connected to one end of the cantilever. The other end of the cantilever is detachably connected to a fixed part of the driving device. The transfer device comprises a bearing platform and two driving assemblies.

10 Claims, 8 Drawing Sheets

(56) References Cited

FOREIGN PATENT DOCUMENTS

| CN | 110116769 A | | 8/2019 | |
|---|---|---|---|---|
| CN | 111776078 A | * | 10/2020 | ............ B62D 21/18 |
| CN | 213705560 U | * | 7/2021 | |
| CN | 213768787 U | | 7/2021 | |
| WO | WO-2021063864 A1 | * | 4/2021 | ............ B62D 49/08 |

OTHER PUBLICATIONS

Computer generated English translation of CN 111776078 (Year: 2025).*

Computer generated English translation of CN 208774905 (Year: 2025).*

* cited by examiner

DRIVING ASSEMBLY AND TRANSFER DEVICE

FIELD

The subject herein generally relates to transfer device, and more particularly to a driving assembly and a transfer device.

BACKGROUND

Most existing transfer platforms adopt an integrated design, and structures with a suitable bearing capacity are required for different loads, so the components of these transfer platforms have poor versatility.

SUMMARY OF THE INVENTION

The present invention is to provide a driving assembly and a transfer device.

In a first aspect, the disclosure provides a driving assembly for driving a bearing platform, the driving assembly comprises:

a driving device;

a driving wheel connected to the driving device, rotatable by the driving device;

a cantilever assembly comprising a cantilever configured for mounting to the bearing platform; and, a driven wheel rotatably connected to one end of the cantilever, and the other end of the cantilever is detachably connected to a fixed part of the driving device.

Optionally, the driving device further comprises a driving component and a mounting plate. The mounting plate comprises opposite first and second ends, the first end is fixedly connected with the driving component, and the second end protrudes from the driving component along a first direction.

Optionally, the cantilever successively comprises a first portion, a second portion, and a third portion in the first direction. Wherein the first portion is connected with the second end, the third portion is connected with the driven wheel, the second portion is connected between the first portion and the third portion, the third portion and the first portion extend along the first direction respectively and are arranged at parallel intervals in the third direction, wherein the third direction is perpendicular to the first direction.

Optionally, a first bump is provided at one end of the first portion along the second direction, a second bump is provided at another end of the first portion along the second direction, the first bump and the second bump are arranged on the same side of the first portion along the first direction, and the second direction is perpendicular to the first direction. The first bump is detachably connected with the second end along the second direction.

Optionally, a plurality of positioning columns and a plurality of first screw holes are provided at top surface along the second direction of the first bump. The mounting plate is provided with a plurality of positioning holes matched with the positioning column and a plurality of through holes corresponding to the first screw hole. The first bump is detachably connected to the second portion by bolts passing through the first screw holes and the through holes.

Optionally, the second bump is provided with a first connecting opening, a second connecting opening, and a third connecting opening along the second direction. The second portion is provided with a first inserting block, a second inserting block, and a third inserting block respectively matched to the first connecting opening, the second connecting opening, and the third connecting opening. The first inserting block is inserted into the first connecting opening, the second inserting block is inserted into the second connecting opening, and the third inserting block is inserted into the third connecting opening, to connect the second bump and the second portion together.

Optionally, the driving assembly further comprises a bearing frame connected to the bearing platform along the second direction. The bearing frame comprises a fixing plate and a support shaft, the fixing plate is connected to the bearing platform, one end of the support shaft is connected with the fixing plate along the second direction, and middle part of the cantilever is rotatably supported on the support shaft.

In a second aspect, the disclosure provides a transfer device, wherein the transfer device comprises the bearing platform and two driving assemblies described above, the two driving assemblies are arranged on opposite sides of the bearing platform along the first direction, wherein the two driving assemblies or the cantilever is connected with the bearing platform.

Optionally, the driving device further comprises a driving component and a mounting plate. The mounting plate comprises opposite first and second ends, the first end is fixedly connected with the driving component, and the second end protrudes from the driving component along a first direction.

Optionally, the cantilever comprises a first portion, a second portion, and a third portion in the first direction. Wherein the first portion is connected with the second end, the third portion is connected with the driven wheel, the second portion is connected between the first portion and the third portion, the third portion and the first portion extend along the first direction respectively and are arranged at parallel intervals in the third direction, wherein the third direction is perpendicular to the first direction.

Optionally, a first bump is provided at one end of the first portion along the second direction, a second bump is provided at another end of the first portion along the second direction, the first bump and the second bump are arranged on the same side of the first portion along the first direction, and the second direction is perpendicular to the first direction. The first bump is detachably connected with the second end along the second direction.

Optionally, a plurality of positioning columns and a plurality of first screw holes are provided at top surface along the second direction of the first bump. The mounting plate is provided with a plurality of positioning holes matched with the positioning column and a plurality of through holes corresponding to the first screw hole. The first bump is detachably connected to the second portion by bolts passing through the first screw holes and the through holes.

Optionally, the second bump is provided with a first connecting opening, a second connecting opening, and a third connecting opening along the second direction. The second portion is provided with a first inserting block, a second inserting block, and a third inserting block respectively matched to the first connecting opening, the second connecting opening, and the third connecting opening. The first inserting block is inserted into the first connecting opening, the second inserting block is inserted into the second connecting opening, and the third inserting block is inserted into the third connecting opening, to connect the second bump and the second portion together.

Optionally, the driving assembly further comprises a bearing frame connected to the bearing platform along the second direction. The bearing frame comprises a fixing plate and a support shaft, the fixing plate is connected to the bearing platform, one end of the support shaft is connected with the fixing plate along the second direction, and middle part of the cantilever is rotatably supported on the support shaft.

Optionally, the transfer device further comprises a connecting bridge and two secondary driven wheels, the two secondary driven wheels are rotatably connected to both ends of the connecting bridge respectively. A middle of the connecting bridge is rotatably connected to the bearing platform, and the two secondary driven wheels are located at an end of the bearing platform opposite to the driven wheel along the first direction.

Optionally, the driven wheel and the secondary driven wheel are omni-directional wheels.

Compared with the prior art, the driving assembly in this embodiment is detachably connected with the driving device through the cantilever. By using cantilevers of different lengths, the driving device with different wheelbases can be obtained, so as to realize the sharing of parts, reducing costs, and facilitating maintenance.

BRIEF DESCRIPTION OF THE DRAWINGS

In order to more clearly explain the technical scheme of the disclosure, the accompanying drawings in the embodiment will be briefly introduced below. It should be understood that the following accompanying drawings only show some and not all embodiments of the invention, so they should not be regarded as limiting the scope. For those skilled in the art, without paying creative labor, relevant drawings can also be developed from these drawings.

DESCRIPTION OF MAIN COMPONENT SYMBOLS driving assembly 100
driving wheel 10a
driven wheel 10b
secondary driven wheel 10c
shaft hole 101
cantilever assembly 12
cantilever 120
first portion 120a
second portion 120b
third portion 120c
first connecting opening 1203
second connecting opening 1204
third connecting opening 1205
first inserting block 1206
second inserting block 1207
third inserting block 1208
first bump 121a
second bump 121b
receiving cavity 122
first cavity 122a
second cavity 122b
first annular boss 122c
positioning column 123
first screw hole 124
bearing 125
support frame 126
fixing plate 126a
support shaft 126b
screw 128
nut 129a
washer 129b
driving device 13
driving component 13a
mounting plate 13b
first end 130a
second end 130b
mounting hole 131
connecting hole 132
positioning hole 133
through hole 134
second annular boss 135
curved through slot 136
flange 14
body 14a
annular protrusion 14b
second screw hole 141
third screw hole 142
transfer device 200
bearing platform 20
connecting bridge 21
bearing assembly 22
sensing module 23

DETAILED DESCRIPTION

The technical scheme in the embodiment of the application will be described in combination with the attached drawings in the embodiment of the application. Obviously, the described embodiments are only part of the embodiments of the application, not all embodiments.

It should be noted that when an element is said to be "fixed to" another element, it can be directly on another element or there can be an intervening element. When a component is "connected" to another component, it can be directly connected to another component or there may be intermediate components at the same time. When a component is "set on" another component, it can be set directly on another component or there may be intervening components at the same time. The terms "vertical", "horizontal", "left", "right" and similar expressions used in this paper are for illustrative purposes only.

Unless otherwise defined, all technical and scientific terms used herein have the same meanings as those commonly understood by those skilled in the technical field of the application. The terms used in the specification of the application herein are only for the purpose of describing specific embodiments and are not intended to limit the application. The term "and/or" as used herein includes any and all combinations of one or more related listed items.

Some embodiments of the present application are described in detail. Without conflict, the following embodiments and features in the embodiments can be combined with each other.

The specific embodiments of the present application will be further described in detail below with reference to the accompanying drawings.

Figure 1:
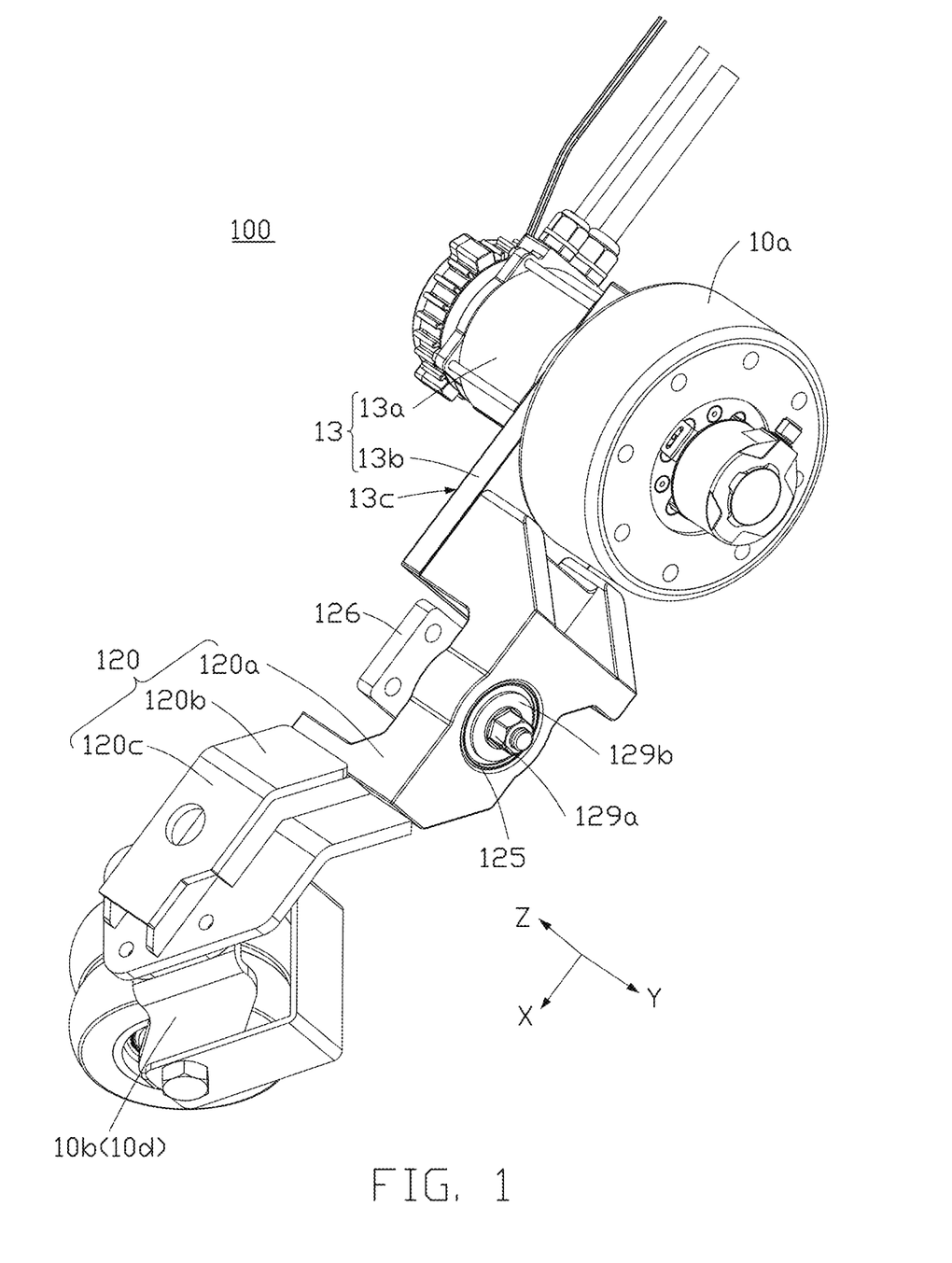
FIG. 1 is a schematic diagram of a driving assembly according to an embodiment of the present application.
Figure 3:
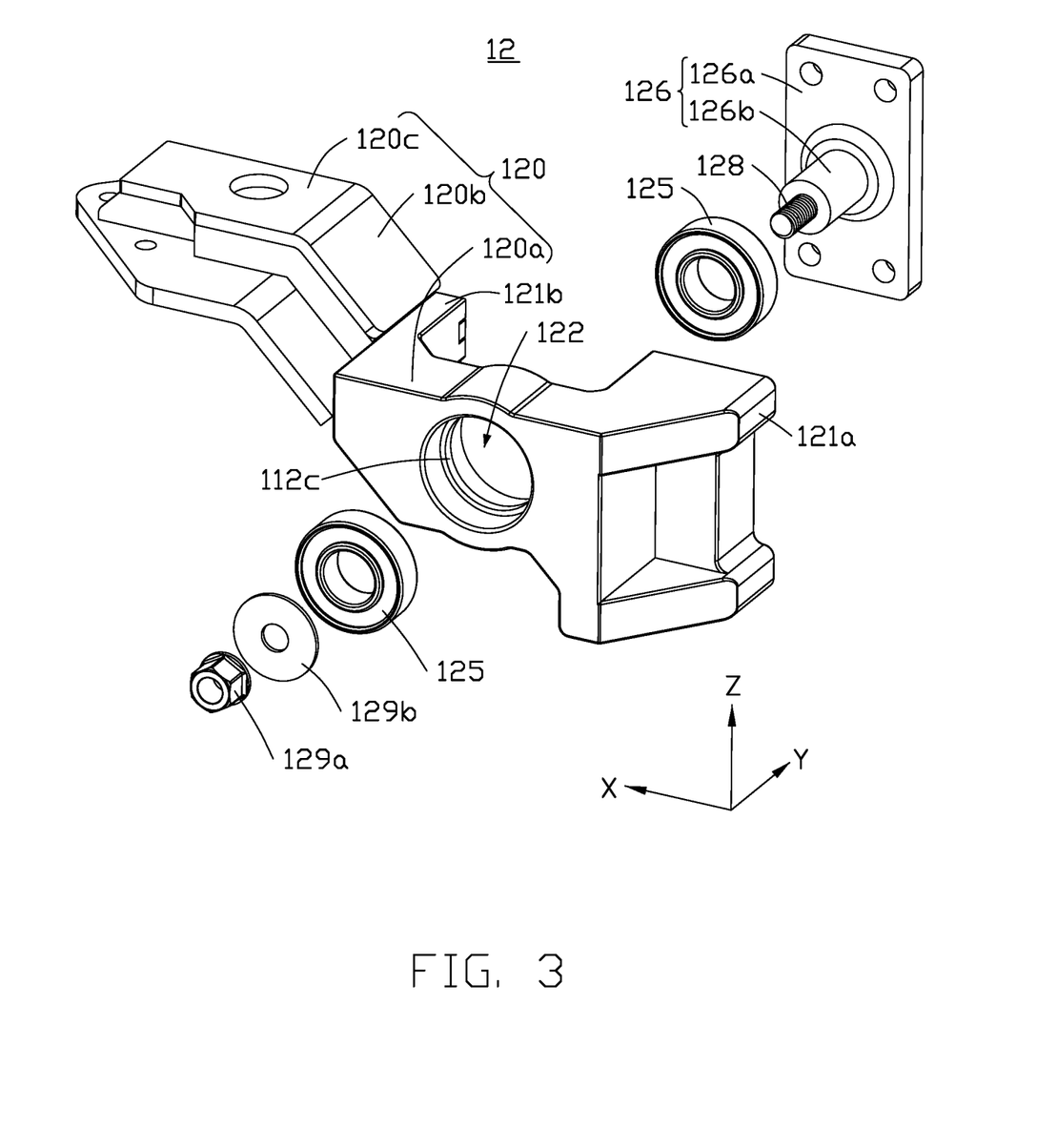
FIG. 3 is a schematic diagram of a cantilever assembly in the driving assembly according to an embodiment of the present application.
Figure 7:
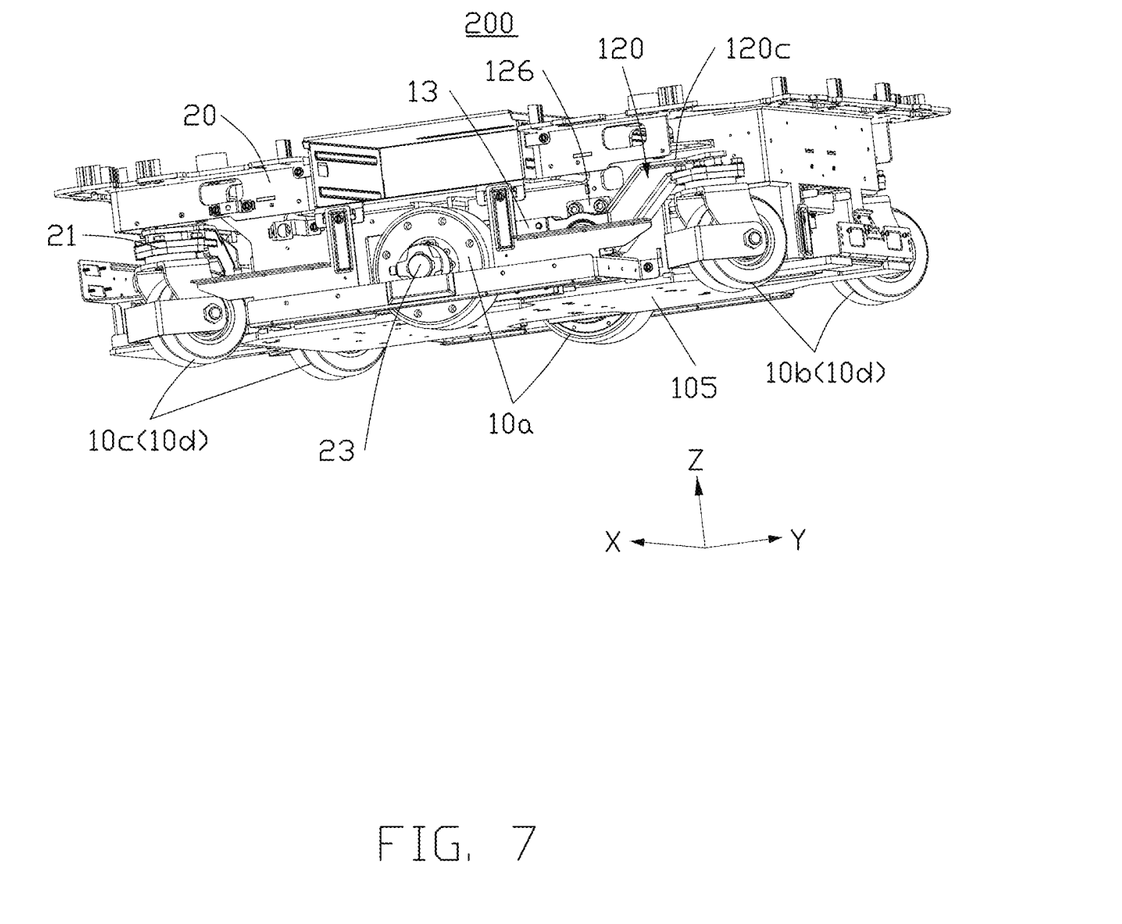
FIG. 7 is a schematic diagram of the transfer device according to an embodiment of the present application.

Referring to FIGS. 1, 3 and 7, X axis in the drawings is named as the first direction, Y axis in the drawings is named as the second direction, and Z axis in the drawings is named as the third direction.

The embodiment of the application provides driving assembly 100 for driving a bearing platform 20. The driving assembly 100 includes driving device 13, driving wheel 10*a*, cantilever assembly 12, and driven wheel 10*b*. The driving wheel 10*a* is connected to the driving device 13 and rotates when driven by the driving device 13. The cantilever assembly 12 includes a cantilever 120. The driven wheel 10*b* is rotatably connected to one end of the cantilever 120, and the other end of the cantilever 120 is detachably connected to the fixed part 13*c* of the driving device 13. The driving device 13 may be an electric motor. The electric motor includes a housing for mounting the electric motor to a base and an output shaft that can rotate when energized.

When in use, the driving assembly 100 in this embodiment is detachably connected with the driving device 13 through the cantilever 120. By using cantilevers of different lengths, the driving device 13 with different wheelbases can be obtained, so as to realize the sharing of parts, reducing costs, and facilitating maintenance.

Figure 2:
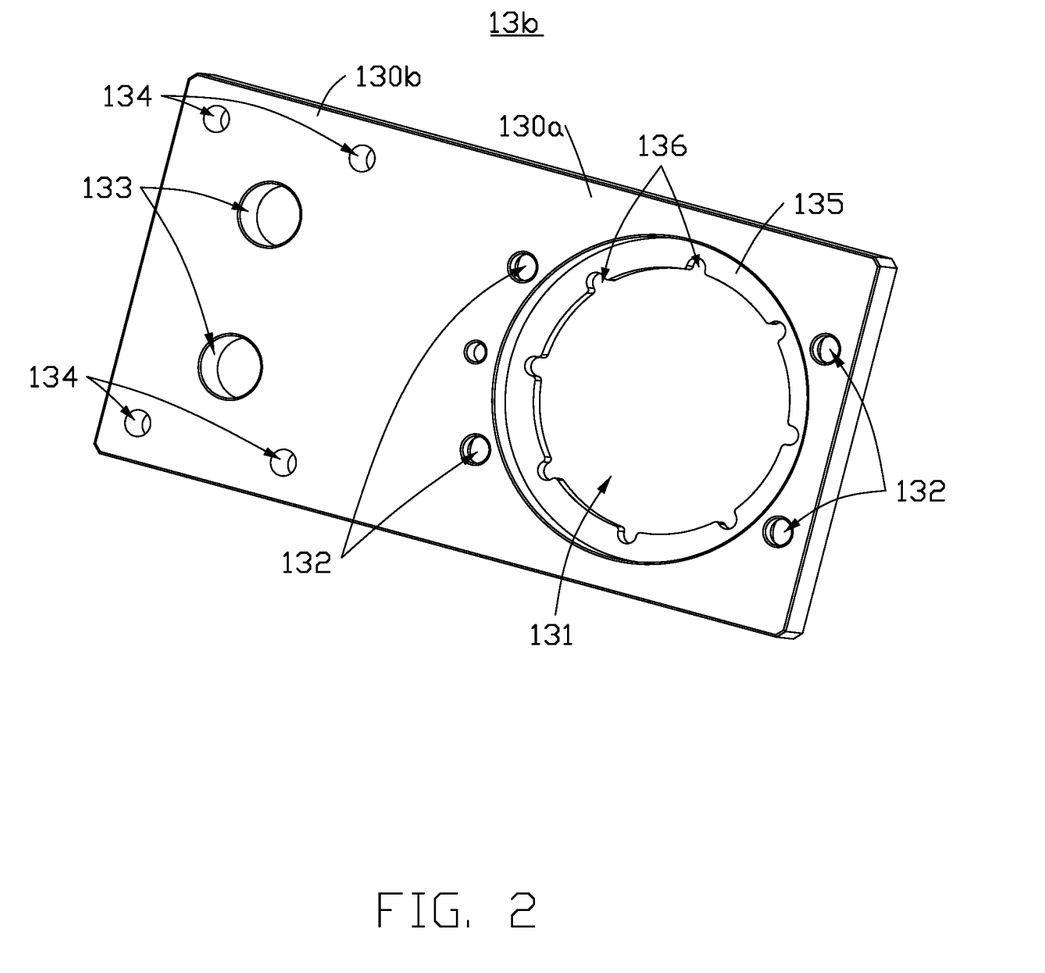
FIG. 2 is a schematic diagram of the mounting plate in the driving assembly according to an embodiment of the present application.

Referring to FIGS. 1 and 2, the driving device 13 further comprises a driving component 13*a* and a mounting plate 13*b*. The mounting plate 13*b* includes opposite first end 130*a* and second end 130*b*, the first end 130*a* is fixedly connected with the driving component 13*a*, and the second end 130*b* protrudes from the driving component 13*a* in the first direction. It should be noted that the fixed part 13*c* of the driving device 13 can be the mounting plate 13*b* or a housing of the driving component 13*a*.

Figure 6:
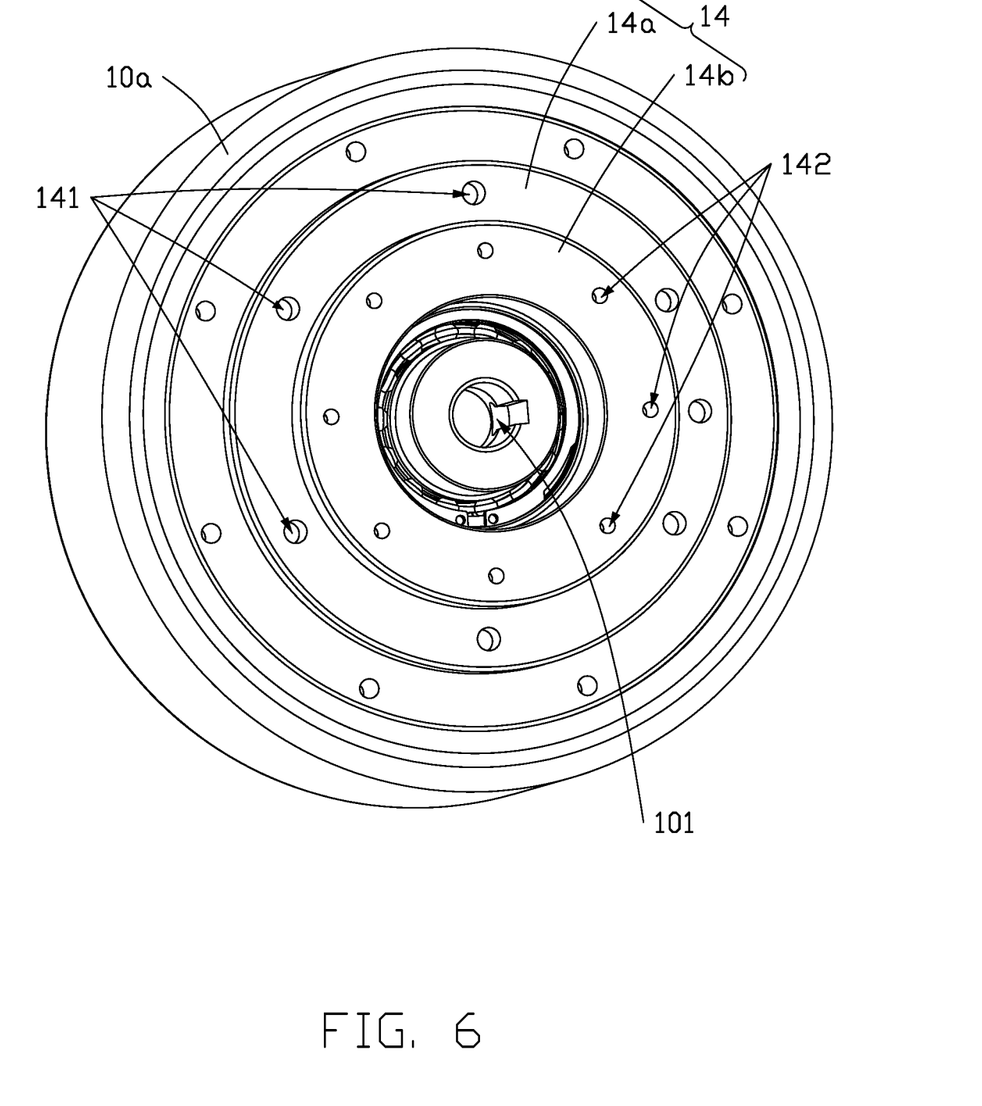
FIG. 6 is a schematic diagram of a driving wheel in the driving assembly according to an embodiment of the present application.

Referring to FIGS. 2 and 6, the first end 130*a* is provided with a mounting hole 131, and a plurality of connecting holes 132 are arranged around the mounting hole 131. The driving wheel 10*a* is provided with a flange 14 which is fixedly connected with the driving wheel 10*a*. The flange 14 includes a body 14*a* and an annular protrusion 14*b*. The body 14*a* is provided with a second screw hole 141 corresponding to the connecting hole 132. The mounting plate 13*b* is sleeved on the outside of the annular protrusion 14*b* through the mounting hole 131, and the mounting plate 13*b* is fixedly connected with the flange 14 through a bolt (not shown in the drawings) through the connecting hole 132 and the second screw hole 141.

Further, the first end 130*a* is also provided with a second annular boss 135, the second annular boss 135 is arranged on the inner surface of the mounting hole 131, and the second annular boss 135 is butted with the annular boss 14*b* in the second direction. The second direction is perpendicular to the first direction.

Further, the inner surface of the second annular boss 135 is provided with a plurality of curved through slots 136, which penetrate the second annular boss 135. The top surface of the annular protrusion 14*b* is provided with third screw holes 142 at intervals, and the third screw holes 142 correspond one-to-one with the curved through slots 136. The driving component 13*a* is provided with an extended output shaft (not shown in the drawings), and the driving wheel 10*a* is provided with a shaft hole 101 adapted to the output shaft. The output shaft is inserted into the shaft hole 101 to connect with the driving wheel 10*a*, and the driving component 13*a* is fixedly connected with the flange 14 by the bolt through the curved through slots 136 and the third screw holes 142. The rotation of the mounting plate 13*b* is prevented by matching the bolt with the curved through slots 136.

Referring to FIG. 1, the cantilever 120 includes a first portion 120*a*, a second portion 120*b*, and a third portion 120*c* in the first direction. Wherein, the first portion 120*a* is connected with the second end 130*b*, the third portion 130*c* is connected with the driven wheel 10*b*, the second portion 130*b* is connected between the first portion 130*a* and the third portion 130*c*, the third portion 130*c* and the first portion 130*a* extend along the first direction respectively and are arranged to be parallel at intervals in the third direction, wherein the third direction is perpendicular to the first direction.

Figure 4:
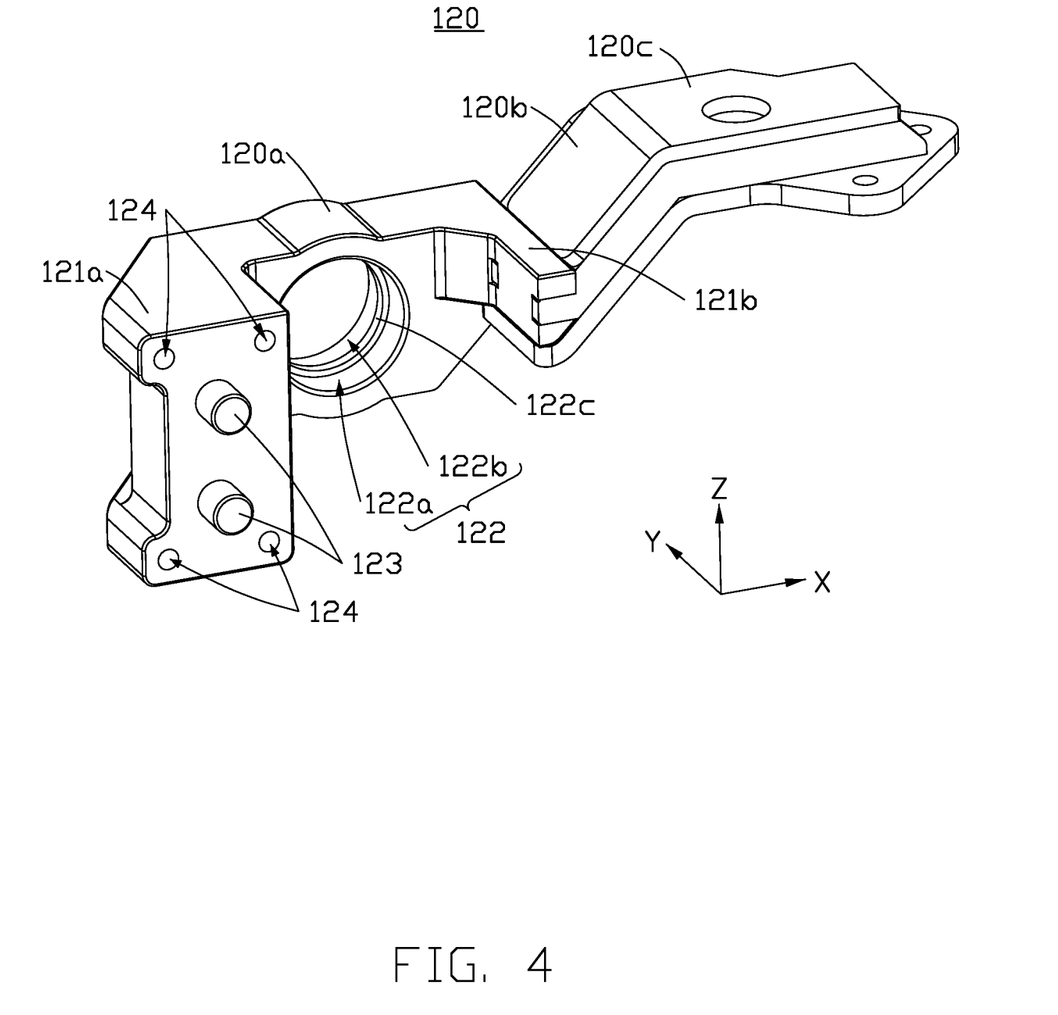
FIG. 4 is a schematic diagram of a cantilever in the driving assembly according to an embodiment of the present application.

Referring to FIG. 4, the first portion 120*a* is provided with a first bump 121*a* and a second bump 121*b* at both ends in the second direction. The first bump 121*a* and the second bump 121*b* are arranged on the same side of the first portion 120*a* in the first direction so that the first bump 121*a*, the second bump 121*b* and the first portion 120*a* are connected to form a U-shaped structure. The first bump 121*a* is detachably connected with the second end 130*b* in the second direction.

Figure 5:
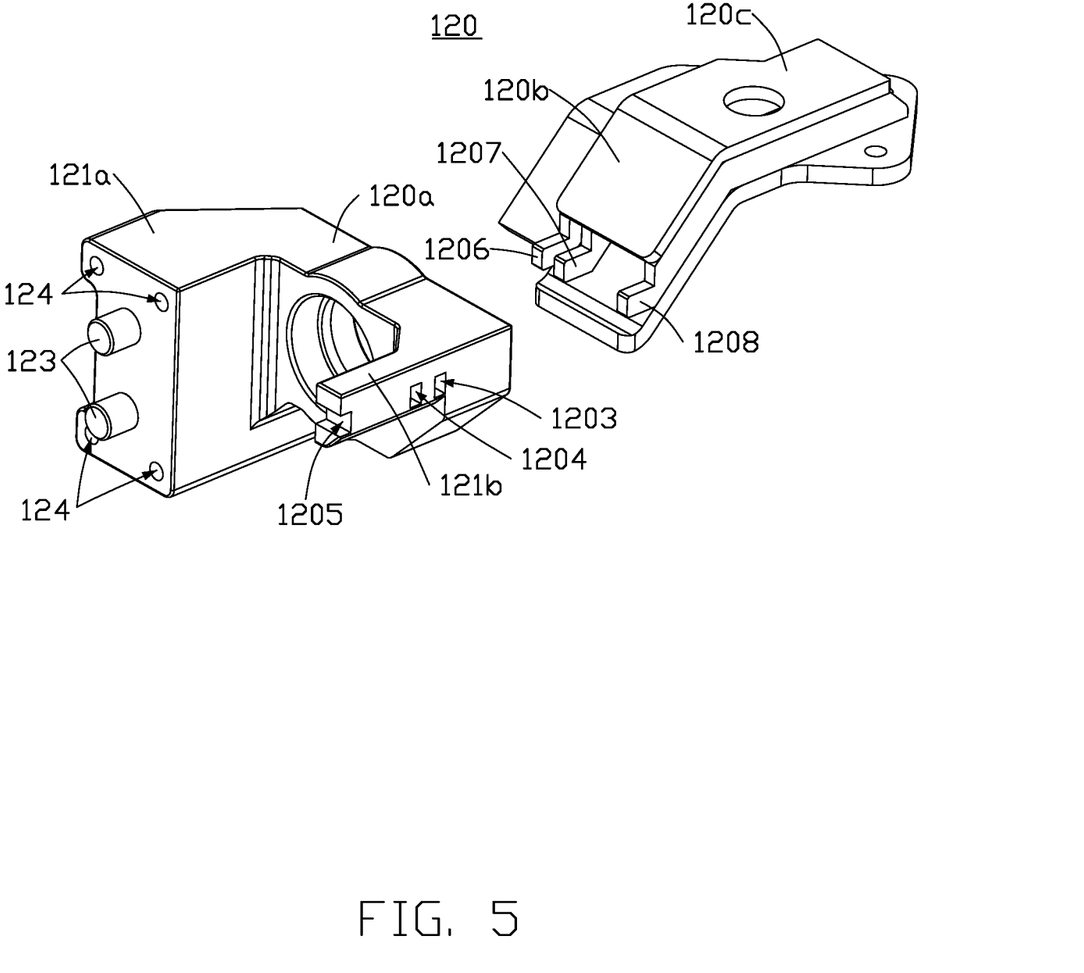
FIG. 5 is an exploded view of the cantilever in the driving assembly according to an embodiment of the present application.

Further, referring to FIGS. 4 and 5, the top surface of the first bump 121*a* along the second direction is provided with a plurality of positioning columns 123 and a plurality of first screw holes 124. The mounting plate 13*b* is provided with a plurality of positioning holes 133 matched with the positioning column 123 and a plurality of through holes 134 corresponding to the first screw holes 124. The first bump 121*a* is detachably connected with the second end 130*b* by the bolt through the through holes 134 and the first screw holes 124. The second bump 121*b* is provided with a first connecting opening 1203, a second connecting opening 1204, and a third connecting opening 1205 along the second direction. The second portion 120*b* is provided with a first inserting block 1206, a second inserting block 1207, and a third inserting block 1208 respectively adapted to the first connecting opening 1203, the second connecting opening 1204, and the third connecting opening 1205. The first inserting block 1206 cooperates with the first connecting opening 1203, the second inserting block 1207 cooperates with the second connecting opening 1204, and the third inserting block 1208 cooperates with the third connecting opening 1205, to detachably connect the second bump 121*b* and the second portion 120*b* together. When the wheelbase of the driving device needs to be changed, only the second portion 120*b* and the third portion 120*c* need to be replaced, reducing the costs.

Referring to FIG. 3, the driving assembly 100 also includes a support frame 126, which is connected to the bearing platform 20 in the second direction. The support frame 126 includes a fixing plate 126*a* and a support shaft 126*b*. The fixing plate 126*a* is connected to the bearing platform 20, one end of the support shaft 126*b* is connected with the fixing plate 126*a* along the second direction, and the middle part of the cantilever 120 is rotatably supported on the support shaft 126*b*. Preferably, the fixing plate 126*a* is accommodated in the space enclosed by the first bump 121*a*, the second bump 121*b*, and the first portion 120*a*. The first portion 120*a* is rotatably supported on the support shaft 126*b*. Further, referring to FIGS. 3 and 4, the support frame 126 also includes a bearing 125, which is sleeved outside the support shaft 126*b*. The first portion 120*a* is provided with a receiving cavity 122, which passes through the first portion 120*a* in the second direction and is located between the first bump 121*a* and the second bump 121*b*. The bearing 125 is fitted with the receiving cavity 122 to facilitate disassembly and replacement, so that the cantilever 120 and the driving device 13 can rotate around the support shaft 126*b*, so that the cantilever assembly 12 provides a suspension system to ensure stability and smooth motion during movement.

In other embodiments, the driving device 13 is fixedly connected with the bearing platform 20 without the support frame 126, and the cantilever 120 is detachably connected to the driving device 13 through the mounting plate 13*b* connected to the driving device 13.

In this embodiment, referring to FIGS. 3 and 4, the inner surface of the first portion 120*a* is provided with a first annular boss 122*c*, and the receiving cavity 122 includes a first cavity 122*a* and a second cavity 122*b*. The top surface of the support shaft 126*b* is provided with a screw 128. Two bearings 125 are respectively installed in the first cavity 122*a* and the second cavity 122*b* and are held against the first annular boss 122*c*. One of the two bearings 125 is sealed in the second cavity 122*b* through a nut 129*a* and the screw 128. Further, a washer 129*b* can be added between the nut 129*a* and the bearing 125.

Referring to FIGS. 1 and 7, this embodiment also provides a transfer device 200, which includes bearing platform 20 and two driving assemblies 100. The two driving assemblies 100 are arranged on opposite sides of the bearing platform 20 along the first direction. Wherein, the driving device 13 or the cantilever 120 is connected with the bearing platform 20. The transfer device 200 can turn through different power outputs of the two driving devices 13 of the two assemblies 100.

Figure 8:
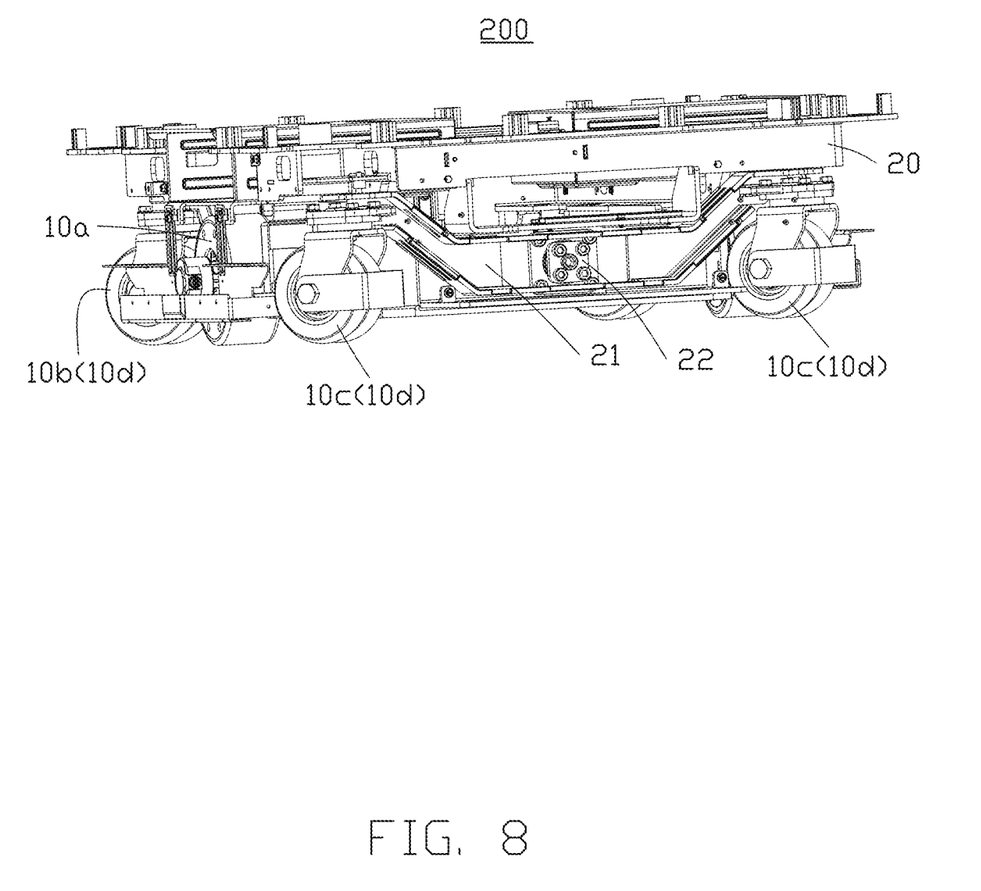
FIG. 8 is another view of the transfer device of FIG. 7.

Referring to FIG. 8, the transfer device 200 also includes a suspension structure. The suspension structure comprises a connecting bridge 21 and a secondary driven wheel 10*c* which are rotatably connected to both ends of the connecting bridge 21. The middle part of the connecting bridge 21 is rotatably connected with the bearing platform 20, and the connecting bridge 21 is arranged at the end of the bearing platform 20 opposite to the driven wheel 10*b* in the first direction, that is, the driving wheel 10*a* is arranged between the driven wheel 10*b* and the secondary driven wheel 10*c* in the first direction.

Further, the suspension structure also includes a bearing assembly 22. The bearing assembly 22 is arranged on the connecting bridge 21, and the bearing assembly 22 is fixedly connected with the bearing platform 20 to rotatably connect the connecting bridge 21 around the bearing assembly 22. In this embodiment, the bearing assembly 22 may be a combination of the bearing 125 and the support frame 126.

In this embodiment, the driving component 13*a* may be an electric motor and the driving wheel 10*a* may be a plastic or rubber tire. The driven wheel 10*b* and the secondary driven wheel 10*c* may be omni-directional wheels 10*d* that may be driven to rotate when pointing anywhere through 360 degrees direction of motion of platform.

The transfer device 200 also includes a control module (not shown in the drawings) and a sensor module 23. The control module is used to control the startup and output power of the driving device 13. The sensor module 23 is used to sense the speed of the driving wheel 10*a*, and the sensor module 23 is installed on the driving wheel 10*a*.

The above embodiments are only used to illustrate the technical solution of the application rather than for limitation. Although the application is described in detail with reference to the above preferred embodiments, those skilled in the art should understand that any modification or equivalent replacement of the technical solution of the application should not deviate from the spirit and scope of the technical solution of the application.

What is claimed is:

1. A driving assembly for driving a bearing platform, comprising:
    a driving device;
    a driving wheel connected to the driving device, rotatable by the driving device;
    a cantilever assembly comprising a cantilever configured for mounting to the bearing platform, and,
    a driven wheel rotatably connected to one end of the cantilever, and the other end of the cantilever is detachably connected to a fixed part of the driving device;
    wherein the driving device further comprises a driving component and a mounting plate;
    the mounting plate comprises opposite first and second ends, the first end is fixedly connected with the driving component, and the second end protrudes from the driving component along a first direction;
    wherein, the cantilever comprises a first portion, a second portion and a third portion in the first direction;
    wherein the first portion is connected with the second end, the third portion is connected with the driven wheel, the second portion is connected between the first portion and the third portion, the third portion and the first portion extend along the first direction respectively and are arranged at parallel intervals in the third direction, wherein the third direction is perpendicular to the first direction;
    wherein a first bump is provided at one end of the first portion along the second direction, a second bump is provided at another end of the first portion along the second direction, the first bump and the second bump are arranged on the same side of the first portion along the first direction, and the second direction is perpendicular to the first direction;
    the first bump is detachably connected with the second end along the second direction.

2. The driving assembly according to claim 1, wherein a plurality of positioning columns and a plurality of first screw holes are provided at top surface along the second direction of the first bump;
    the mounting plate is provided with a plurality of positioning holes matched with the positioning column and a plurality of through holes corresponding to the first screw hole;
    the first bump is detachably connected to the second portion by bolts passing through the first screw holes and the through holes.

3. The driving assembly according to claim 1, wherein the second bump is provided with a first connecting opening, a second connecting opening and a third connecting opening along the second direction;
    the second portion is provided with a first inserting block, a second inserting block and a third inserting block respectively matched to the first connecting opening, the second connecting opening and the third connecting opening;
    the first inserting block is inserted into the first connecting opening, the second inserting block is inserted into the second connecting opening, and the third inserting block is inserted into the third connecting opening, to connect the second bump and the second portion together.

4. The driving assembly according to claim 1, wherein the driving assembly further comprises a bearing frame connected to the bearing platform along the second direction;

the bearing frame comprises a fixing plate and a support shaft, the fixing plate is connected to the bearing platform, one end of the support shaft is connected with the fixing plate along the second direction, and middle part of the cantilever is rotatably supported on the support shaft.

5. A transfer device, wherein the transfer device comprises the bearing platform and two driving assemblies according to claim 1, the two driving assemblies are arranged on opposite sides of the bearing platform along the first direction, wherein the two driving assemblies or the cantilever is connected with the bearing platform.

6. The transfer device according to claim 5, wherein a plurality of positioning columns and a plurality of first screw holes are provided at top surface along the second direction of the first bump;

the mounting plate is provided with a plurality of positioning holes matched with the positioning column and a plurality of through holes corresponding to the first screw hole;

the first bump is detachably connected to the second portion by bolts passing through the first screw holes and the through holes.

7. The transfer device according to claim 5, wherein the second bump is provided with a first connecting opening, a second connecting opening and a third connecting opening along the second direction;

the second portion is provided with a first inserting block, a second inserting block and a third inserting block respectively matched to the first connecting opening, the second connecting opening and the third connecting opening;

the first inserting block is inserted into the first connecting opening, the second inserting block is inserted into the second connecting opening, and the third inserting block is inserted into the third connecting opening, to connect the second bump and the second portion together.

8. The transfer device according to claim 5, wherein the driving assembly further comprises a bearing frame connected to the bearing platform along the second direction;

the bearing frame comprises a fixing plate and a support shaft, the fixing plate is connected to the bearing platform, one end of the support shaft is connected with the fixing plate along the second direction, and middle part of the cantilever is rotatably supported on the support shaft.

9. The transfer device according to claim 5, wherein the transfer device further comprises a connecting bridge and two secondary driven wheels, the two secondary driven wheels are rotatably connected to both ends of the connecting bridge respectively, a middle of the connecting bridge is rotatably connected to the bearing platform, and the two secondary driven wheels are located at an end of the bearing platform opposite to the driven wheel along the first direction.

10. The transfer device according to claim 9, wherein the driven wheel and the secondary driven wheel are omnidirectional wheels.

\* \* \* \* \*